US010856537B1

(12) United States Patent
Velardi

(10) Patent No.: US 10,856,537 B1
(45) Date of Patent: Dec. 8, 2020

(54) QUICK DROP LINE MANAGEMENT SYSTEM FOR FISHING OUTRIGGERS

(71) Applicant: Andrew Velardi, Deerfield Beach, FL (US)

(72) Inventor: Andrew Velardi, Deerfield Beach, FL (US)

( * ) Notice: Subject to any disclaimer, the term of this patent is extended or adjusted under 35 U.S.C. 154(b) by 609 days.

(21) Appl. No.: 15/459,286

(22) Filed: Mar. 15, 2017

Related U.S. Application Data

(60) Provisional application No. 62/309,128, filed on Mar. 16, 2016.

(51) Int. Cl.
| | |
|---|---|
| *A01K 91/08* | (2006.01) |
| *A01K 91/053* | (2006.01) |
| *A01K 87/04* | (2006.01) |
| *A01K 99/00* | (2006.01) |
| *B65H 57/14* | (2006.01) |

(52) U.S. Cl.
CPC .............. *A01K 91/08* (2013.01); *A01K 87/04* (2013.01); *A01K 91/053* (2013.01); *A01K 99/00* (2013.01); *B65H 57/14* (2013.01); *B65H 2701/355* (2013.01)

(58) Field of Classification Search
CPC ...... A01K 87/04; A01K 91/08; A01K 91/053; A01K 87/007; B63B 35/14
USPC ............. 43/24, 27.4, 43.12, 43.13, 27.2, 25; 114/255, 364; 254/390, 409
See application file for complete search history.

(56) References Cited

U.S. PATENT DOCUMENTS

| | | | | | |
|---|---|---|---|---|---|
| 1,665,316 | A | * | 4/1928 | Matthews | H02G 11/003 248/51 |
| 1,710,697 | A | * | 4/1929 | Gilbert | B63B 21/08 114/199 |
| 2,596,835 | A | * | 5/1952 | Benge | A01K 87/04 24/567 |
| 2,642,025 | A | * | 6/1953 | Swonger | B63B 21/22 114/210 |
| 2,652,654 | A | * | 9/1953 | Bahn | A01K 87/04 43/24 |
| 2,838,279 | A | * | 6/1958 | Parkyn | H02G 1/04 254/134.3 PA |
| 2,897,616 | A | * | 8/1959 | Edwards | H02G 11/003 38/104 |
| 2,965,329 | A | * | 12/1960 | Summers | A01K 87/04 242/129.8 |
| 3,050,898 | A | * | 8/1962 | Bernd | A01K 91/02 43/25 |

(Continued)

FOREIGN PATENT DOCUMENTS

| | | | | | |
|---|---|---|---|---|---|
| CA | 2475158 | A1 * | 1/2006 | ........... | A01K 89/003 |
| FR | 1116675 | A * | 5/1956 | ............. | A01K 87/04 |

(Continued)

*Primary Examiner* — Darren W Ark
(74) *Attorney, Agent, or Firm* — Mark D. Bowen, Esq.; Malin Haley DiMaggio & Bowen, P.A.

(57) ABSTRACT

Quick drop halyard line roller guides for removable attachment to existing outriggers to allow the user to quickly drop the halyard rigging lines from the outriggers. Quick release roller line guides are provided for removable attachment to the existing eyelet-type circular outrigger line guides. Quick and installation and removal of outrigger halyard lines permits the lines to be safely stored away from harsh environmental conditions when not use thereby extending line life.

6 Claims, 3 Drawing Sheets

(56) References Cited

U.S. PATENT DOCUMENTS

| | | | | |
|---|---|---|---|---|
| 3,058,254 A * | 10/1962 | Gorham | ................ | A01K 87/04 43/24 |
| 3,059,906 A * | 10/1962 | Powell | ................ | B62K 23/06 254/416 |
| 3,222,812 A * | 12/1965 | Gorham | ................ | A01K 87/04 43/24 |
| 3,255,997 A * | 6/1966 | Ferdig | ................ | E06B 9/44 254/409 |
| 3,350,809 A * | 11/1967 | Chion | ................ | A01K 87/04 43/24 |
| 3,446,484 A * | 5/1969 | Walsh | ................ | B66D 3/04 254/390 |
| 3,581,427 A * | 6/1971 | Reinertson | ................ | A01K 87/04 43/24 |
| 3,760,524 A * | 9/1973 | Butler, Jr. | ................ | A01K 87/04 156/165 |
| 3,971,151 A * | 7/1976 | Banner | ................ | A01K 87/04 43/24 |
| 4,156,983 A * | 6/1979 | Moore | ................ | A01K 87/00 43/25 |
| 4,428,141 A * | 1/1984 | Kovalovsky | ................ | A01K 87/04 242/157 R |
| 4,702,031 A * | 10/1987 | Sousa | ................ | A01K 97/12 43/17 |
| 4,807,385 A * | 2/1989 | Morishita | ................ | A01K 87/04 43/24 |
| 4,823,496 A * | 4/1989 | Powell | ................ | A01K 97/12 43/25 |
| 5,159,776 A * | 11/1992 | Horton | ................ | A01K 87/005 43/24 |
| 5,531,041 A * | 7/1996 | Betto | ................ | A01K 87/04 43/24 |
| 5,822,910 A * | 10/1998 | Shewmake | ................ | A01K 91/06 43/25 |
| 6,802,151 B1 * | 10/2004 | Jochum | ................ | A01K 91/06 43/24 |
| 6,834,459 B2 * | 12/2004 | van Weenen | ................ | A01K 91/08 43/27.4 |
| 7,007,425 B2 * | 3/2006 | Maguire | ................ | A01K 87/002 43/24 |
| 8,656,632 B1 * | 2/2014 | Mercier | ................ | A01K 91/08 43/27.4 |
| 9,125,391 B2 * | 9/2015 | Egan, Jr. | ................ | A01K 87/04 |
| 9,532,556 B2 * | 1/2017 | Farrington | ................ | A01K 87/007 |
| 9,717,226 B1 * | 8/2017 | Mercier | ................ | A01K 91/08 |
| 2003/0074827 A1 * | 4/2003 | Maguire | ................ | A01K 87/002 43/24 |
| 2005/0034353 A1 * | 2/2005 | Gustlin | ................ | A01K 87/04 43/24 |
| 2006/0231009 A1 * | 10/2006 | Slatter | ................ | A01K 91/08 114/255 |
| 2007/0181514 A1 * | 8/2007 | Mantey | ................ | A01K 91/08 211/60.1 |
| 2012/0060403 A1 * | 3/2012 | LoPresti | ................ | A01K 87/04 43/24 |
| 2013/0097914 A1 * | 4/2013 | Barber | ................ | A01K 87/04 43/24 |
| 2013/0239456 A1 * | 9/2013 | Leffler | ................ | A01K 87/04 43/23 |
| 2016/0152452 A1 * | 6/2016 | Barnet | ................ | B63B 21/04 254/390 |
| 2016/0286771 A1 * | 10/2016 | Sugaya | ................ | A01K 87/04 |
| 2017/0071178 A1 * | 3/2017 | Serocki | ................ | A01K 91/08 |
| 2017/0086442 A1 * | 3/2017 | Onorato | ................ | A01K 97/10 |
| 2017/0089374 A1 * | 3/2017 | Onorato | ................ | F16B 7/1418 |
| 2017/0251651 A1 * | 9/2017 | Beauchamp | ................ | A01K 87/02 |
| 2018/0014522 A1 * | 1/2018 | Bridgewater | ................ | F16B 7/1418 |
| 2018/0027789 A1 * | 2/2018 | Snopkowski | ................ | A01K 87/04 |
| 2019/0159438 A1 * | 5/2019 | Stirling | ................ | A01K 87/04 |

FOREIGN PATENT DOCUMENTS

| | | | | |
|---|---|---|---|---|
| FR | 1464755 A | * | 1/1967 | ............ A01K 89/003 |
| GB | 851755 A | * | 10/1960 | |
| GB | 974687 A | * | 11/1964 | |
| JP | 01187041 A | * | 7/1989 | ............ A01K 87/04 |
| JP | 07313023 A | * | 12/1995 | |
| JP | 3208137 U | * | 12/2016 | ............ A01K 89/003 |
| JP | 2019041770 A | * | 3/2019 | |
| WO | WO-2013148715 A1 | * | 10/2013 | ............ A01K 87/04 |
| WO | WO-2018022688 A1 | * | 2/2018 | ............ B65H 59/00 |
| WO | WO-2018131006 A1 | * | 7/2018 | ............ A01K 87/04 |

* cited by examiner

QUICK DROP LINE MANAGEMENT SYSTEM FOR FISHING OUTRIGGERS

CROSS REFERENCE TO RELATED APPLICATIONS

This application claims the benefit of provisional. U.S. Patent Application Ser. No. 62/309,128, filed on Mar. 16, 2016.

STATEMENT REGARDING FEDERALLY SPONSORED RESEARCH OR DEVELOPMENT

N/A

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all rights whatsoever.

BACKGROUND OF THE INVENTION

1. Field of the Invention

The present invention generally relates to fishing outrigger systems, and more particularly to a quick drop line management system including removable line guides for attachment to fishing outriggers to allow for quick and easy removal of outrigger lines when not in use.

2. Description of Related Art

Sport fishing involves targeting a wide variety of fish including marlin, sailfish, dolphin, tuna, grouper, wahoo, and tarpon. An effective method of catching the fish involves a technique referred to as trolling. In accordance with this method, baited hooks are towed behind the stern of the vessel. It is desirable to have as many lines as possible in the water in order to increase the chance of hooking a fish. The use of additional lines, however, increases the chance of the lines becoming tangled.

As a result of the need to maximize the number of lines while minimizing line entanglement, sport fishing outriggers are employed to keep the multiple lines separated so as to prevent entanglement. An outrigger consists of a long pole, or boom, which is attached to the boat and is deployed to extend laterally outward from the boat. Baited fishing lines are secured outrigger rigging lines (also referred to as halyard lines) by release clips, such that the fishing lines are maintained in spaced relation to provide increased separation. When the fish strikes the bait, the release clip releases the fishing line from the outrigger and the fisherman reels in the fish. Outriggers are typically configured to be pivoted to a stowed position wherein the outriggers are folded alongside the boat, and deployed by swinging the outriggers laterally outward to achieve maximum line spread.

In addition, telescopically adjustable outriggers have been developed for use with smaller vessels. These outriggers are further configurable to a compact telescopically retracted configuration when not in use, and a telescopically extended configuration when deployed. Telescoping outrigger poles are typically comprised of three telescopically adjustable sections which are adjustable from a retracted configuration to extended configurations of 15 to 18 feet or more, or less depending on the rig.

One problem plaguing fishing outriggers relates to the management and maintenance of outrigger rigging lines (a/k/a halyard lines). More particularly, since removal of rigging lines is time consuming, most outrigger users leave the rigging lines permanently installed thereby leaving the lines constantly exposed to the elements which causes the lines to degrade thereby requiring premature replacement. Another problem particularly plaguing telescopic outriggers involves management of excess slack rigging line when the outrigger is retracted and stowed from the extended/use configuration. The excess slack line becomes a tangled mess accumulating on the vessel deck.

As a result of these problems, the background art reveals several devices directed to outrigger line management. For example, U.S. Pat. No. 6,834,459, issued to Van Weenen, provides a line recoil device for telescoping outriggers which recoils an outrigger line when an outrigger is collapsed. Further, U.S. Patent Application Publication No. 2006/0231009, by inventor S latter, discloses a rigging caddy for use with telescoping outriggers to allow for the excess line formed upon collapse of the outrigger to be wound about a pair of opposing L-shaped anchor points. The U.S. Patent Application Publication No. 2007/0181514, by inventor Mantey, discloses a cord organizer for telescoping outriggers which is attached by a pair of clips. The references discussed above, however, all suffer from a significant limitation. More particularly, while those references provides apparatus for organizing excess rigging line, the rigging line remains attached to the outrigger and thus exposed to the harsh marine environment thereby leading to environmentally induced degradation.

While the devices of the background art appear satisfactory for the limited purposes to which they are directed, there remains a need for further advancements in field of fishing outrigger line management.

BRIEF SUMMARY OF THE INVENTION

The present invention overcomes the limitations and disadvantages present in the art by providing quick drop roller line guide accessory devices for removable attachment to existing outriggers to allow the user to quickly remove and install the halyard rigging line. By providing for quick and installation and removal of outrigger halyard lines, the lines can be safely stored when not in use thereby extending useful life of the lines. In accordance with the present invention, quick release roller guides are provided for removable attachment to the existing eyelet-type circular outrigger line guides. Each roller guide is fabricated from corrosion resistant material and includes a main body having an attachment section and a roller line guide section. The attachment section defines a gap for receiving the eyelet portion of an existing outrigger line guide therein, and a rotatable threaded faster to secure the main body to the existing line guide. The roller line guide section provides a roller line guide for receiving the outrigger halyard line and guiding the line when in use. When the use of the outrigger is complete, the quick release roller guides can be quickly removed from the outrigger by backing-out the fastener and removing the roller guide(s) from the outrigger along with the rigging lines associated therewith such that the roller guides and rigging line may be completely removed and stored. Further, installation simply involves removal of the outrigger rigging lines and line guides from storage and installation thereof by simple attachment of the roller guides to the existing outrigger line guide eyelets.

Accordingly, it is an object of the present invention to provide advancements in the field of sport fishing outriggers.

It is another object of the present invention to provide advancements relating to line management associated with sport fishing outriggers.

Another object of the present invention is to provide removable line guides for use with outriggers to enable simple installation and removal of halyard rigging lines.

Yet another object of the present invention is provide a system and method for rapid installation of, and quick removal of, halyard rigging lines for any fishing outriggers having eyelets.

In accordance with these and other objects, which will become apparent hereinafter, the instant invention will now be described with particular reference to the accompanying drawings.

DETAILED DESCRIPTION OF THE INVENTION

The present invention may be understood more readily by reference to the following detailed description taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

With reference now to the drawings, FIGS. 1-5 depict various views of a quick-release roller guide line management accessory, generally referenced as 10, for use with fishing outriggers. In accordance with the present invention, quick-release roller guides 10 are provided for use with either telescoping or non-telescoping fishing outriggers by removable attachment to the existing eyelet-type circular outrigger line guides.

Figure 1:
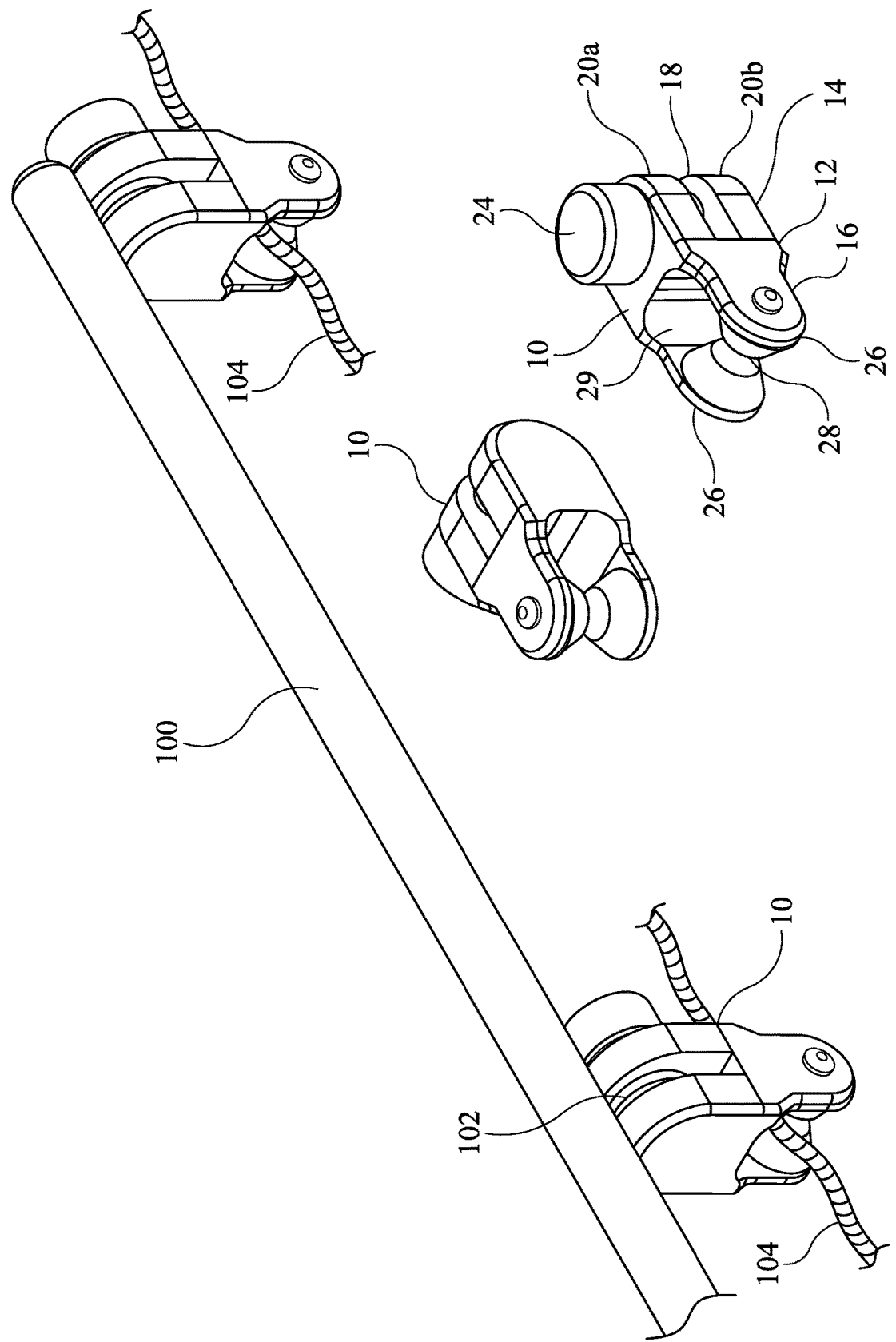
FIG. 1 includes perspective illustrations of a quick release line guide device and an outrigger adapted with quick release line guide devices in accordance with the present invention.

As best illustrated in FIG. 1, outrigger roller guide accessory 10 is adapted for removable attachment to an outrigger, generally referenced as 100, and more particularly to the eyelet 102 of an outrigger line guide, to allow the user to quickly drop the halyard rigging line 104 from the outrigger. By providing for quick installation and removal an outrigger halyard line, the lines can be safely stored out of exposure to the elements when not in use thereby extending the life of the rigging lines.

Figure 2:
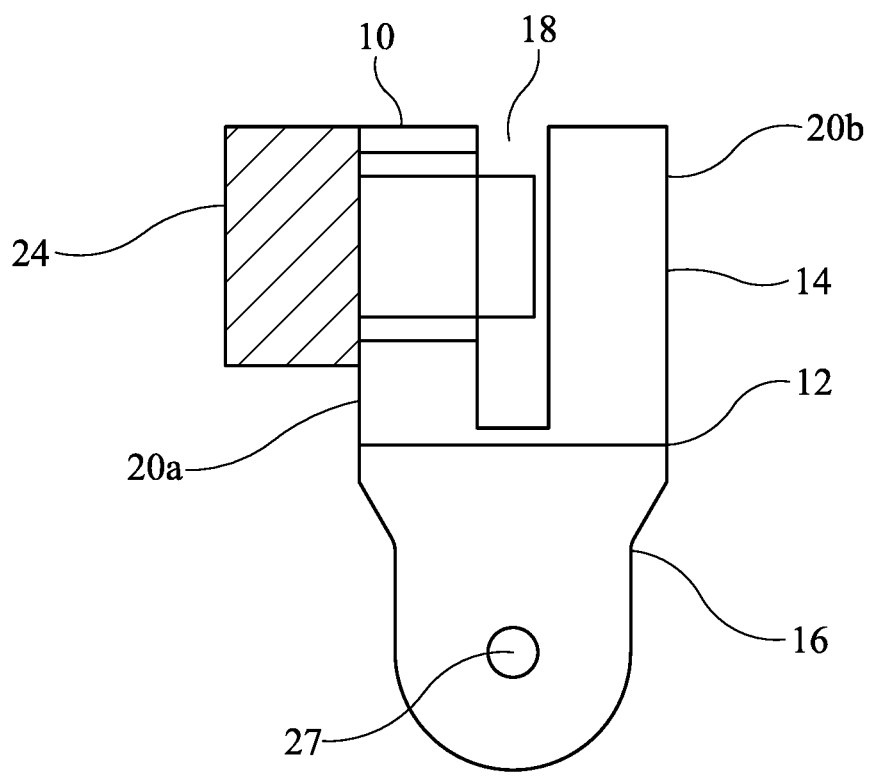
FIG. 2 is a side view illustration of the quick release line guide device.
Figure 3:
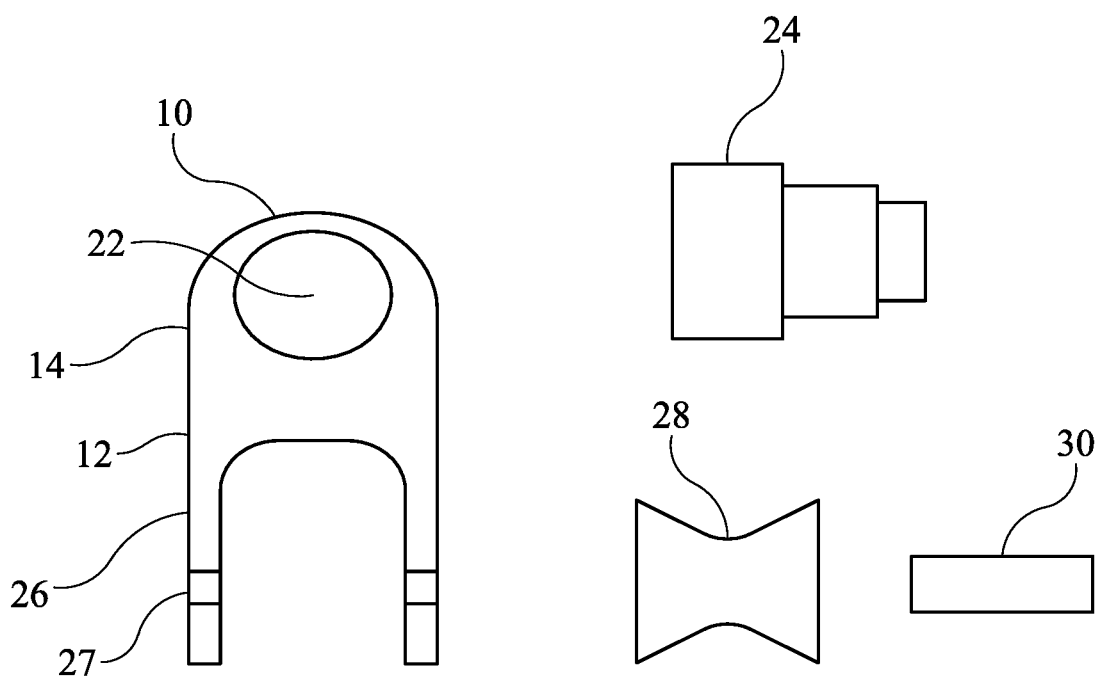
FIG. 3 depicts an exploded parts view of a quick release line guide device in accordance with the present invention.

As further illustrated in FIGS. 2 and 3, roller guide 10 includes a main body 12 having an attachment section 14 and a roller line guide section 16. Roller guide 10 is preferably fabricated from corrosion-resistant synthetic material such as polyvinyl chloride ("PVC") and/or DELRIN® (DELRIN® is a registered trademark of E.I. DuPont de Neumours), however any suitable material, including aluminum or other metal, is considered within the scope of the present invention. Attachment section 14 defines a gap 18 formed between two spaced projecting arms, referenced as 20a and 20b, for receiving the eyelet 102 of an existing outrigger line guide inserted therein. Arm 20a defines an internally threaded aperture 22 that receives a rotatable threaded fastener or thumb screw 24, designed to be twisted by hand into the predrilled threaded aperture 22, which functions upon twisting to project the end of fastener 24 through the eyelet 102 to secure the main body to the existing line guide. In a preferred embodiment, the end of fastener 24 engages the inner surface of arm 20b so as to allow the user to rotate the thumb screw to a configuration wherein stress force resists unintended loosening thereof. Roller guide 10 is attached to an outrigger eyelet disposed within gap 18 by screwing in thumbscrew 24 until the end thereof is substantially adjacent the inner surface of arm 20b. One advantage of this attachment configuration involves enabling roller guide 10 to pivot or swivel with the thumb screw functioning as an axial pivot point relative to the outrigger eyelet so as to maintain proper support to the outrigger halyard line in a variety of operating conditions. As noted above, roller guide 10 further includes a roller line guide section 16 which includes two spaced projecting arms, each referenced as 26 and 26. Each arm 26 defines an aperture 27. A roller 28 is rotatably supported by a stainless steel axle 30 secured to arms 26 by fasteners received through apertures 27. A line guide opening or aperture 29 is formed between roller 28, arms 26, and main body 12 as seen in FIG. 1. Line guide aperture 29 is extends generally parallel with thumb screw fastener 24. As should be apparent, roller 28 functions as a roller line guide for receiving the outrigger halyard line and guiding the line when in use. While the preferred embodiment is directed to use of a single roller, alternate embodiments may include a plurality of rollers. In a further alternate embodiment an eyelet may be substituted for the use of a roller.

Figure 4:
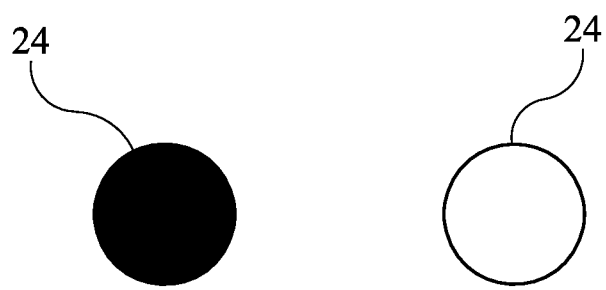
FIG. 4 illustrates end views of the thumb screws which are color coded in accordance with the present invention.
Figure 5:
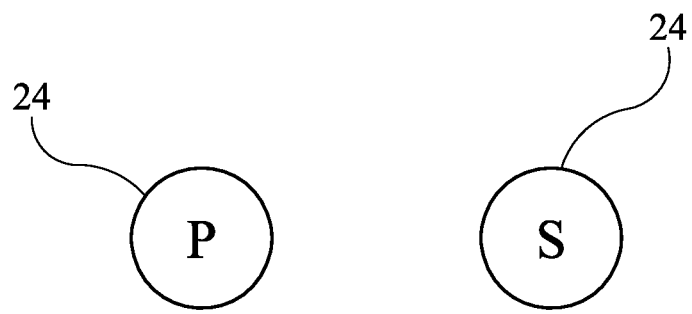
FIG. 5 illustrates end views of thumb screws bearing location indicating indicia in accordance with the present invention.

As illustrated in FIG. 1, a quick-drop roller guide 10 is preferably attached to each outrigger eyelet with the halyard rigging line threaded through roller line guide section 16. Since outriggers typically have more than one line guide, the present invention contemplates color coding of a plurality of roller guides 10 such that the roller guide intended for installation at the tip of the outrigger has a color coded marking (e.g. black thumb screw knob) whereas the remaining roller guides have a different color coded marking (e.g.

white thumb screw knobs) as illustrated in FIG. 4. This feature provides a rigging aid to simplify correct installation of the line management system. In addition, the line guides of the present invention may include indicia to identify whether the line management system is intended for installation on the port or starboard outrigger. For example, a plurality of line guides may be marked with a "P" (for port) and a second plurality of line guides may be marked with "S" (for starboard) as illustrated in FIG. 5. Furthermore, the line guides may have numeric indicia to indicate their intended eyelet location (e.g. 1, 2, 3, etc.) along the outrigger.

A significant aspect of the present invention involves the quick release aspect of the present invention which allows the rigging lines to be dropped and stored out of the elements by removal of the roller guides and rigging line associated therewith. Thus, when the use of the outrigger is complete, the quick release roller guides can be quickly removed from the outrigger by backing out the thumb-screw fastener and removing the roller guide(s) from the outrigger along with the rigging lines associated therewith such that the roller guides and rigging line may be completely removed and stored. As noted above, leaving halyard lines permanently installed on the outriggers significantly contributes to wear and failure due to prolonged exposure to harsh environmental conditions. Storing the rigging lines protected from exposure to the environment significantly extends the life of the rigging line. Further, removing the rigging lines also provides a significant line management advantage, particularly for telescoping outriggers where the excess slack line gathered when the outrigger is telescopically retracted is a recognized problem. More particularly, removal of the halyard lines eliminates the need for line to management accessories, such as rigging caddies, line winders, and the like as disclosed in the background art.

The quick release aspect of the present invention further provides for quick re-installation of the rigging line(s) by simple re-attachment of the roller guides to the outrigger eyelets. Prior to deployment of the outrigger(s) the rigging lines and line guides are removed from storage and quickly installed by simple attachment of the roller guides to the existing outrigger line guide eyelets. As should be apparent removal and/or installation of the roller guides is accomplished by a simple twist of the thumb-screw type fastener.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A removable line guide system for use with a halyard line on a fishing outrigger having a plurality of line guide eyelets, said line guide system comprising:
   a plurality of removable roller line guides, including a respective one of said plurality of removable roller line guides for each line guide eyelet of said plurality of line guide eyelets;
   each of said plurality of removable roller line guides including a main body having an attachment section and a line guide section;
   said attachment section including a pair of arms, said arms defining a gap there between;
   a thumb screw in threaded engagement with one of said arms, said thumb screw having a knob at one end thereof and terminating at a distal end, said distal end disposed in said gap and substantially adjacent in relation with the other one of said arms when rotated clockwise to a maximum extent;
   said line guide section defining an opening extending generally parallel with said thumb screw;
   said main body is removably attached to the outrigger by insertion of one of said plurality of line guide eyelets of said fishing outrigger within said gap and secured thereto by said thumb screw, with the outrigger halyard line extending through said opening.

2. The removable line guide system according to claim 1, wherein one of said plurality of roller guides has a color coded marking, and the remaining of said plurality of roller guides have a different color coded marking from the one of said plurality of roller guides.

3. The removable line guide system according to claim 1, wherein said thumb screw has alpha-numeric indicia thereon.

4. In a fishing outrigger having an outrigger line and a plurality of line guide eyelets, wherein the improvement comprises:
   a plurality of removable roller line guides, including a respective one of said plurality of removable roller line guides for each line guide eyelet of said plurality of line guide eyelets;
   each of said plurality of removable roller line guides including a main body having an attachment section and a line guide section;
   said attachment section including a pair of arms, said arms defining a gap there between;
   a thumb screw in threaded engagement with one of said arms, said thumb screw having a knob at one end thereof and terminating at a distal end, said distal end disposed in said gap and substantially adjacent in relation with the other one of said arms when rotated clockwise to a maximum extent;
   said line guide section defining an opening extending generally parallel with said thumb screw;
   whereby said main body is removably attached to the outrigger by insertion of one of said plurality of line guide eyelets of said fishing outrigger within said gap and secured thereto by said thumb screw, with the outrigger line extending through said opening.

5. The removable line guide system according to claim 4, wherein one of said plurality of roller guides has a color coded marking, and the remaining of said plurality of roller guides have a different color coded marking from the one of said plurality of roller guides.

6. The removable line guide system according to claim 4, wherein said thumb screw has alpha-numeric indicia thereon.

* * * * *